(12) United States Patent
Cavanaugh et al.

(10) Patent No.: US 12,020,346 B2
(45) Date of Patent: Jun. 25, 2024

(54) AIRCRAFT COMMUNICATION VISUALIZATION

(71) Applicant: RTX Corporation, Farmington, CT (US)

(72) Inventors: Creig M. Cavanaugh, Marlborough, CT (US); Paul Raymond Scheid, West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 2 days.

(21) Appl. No.: 17/572,982

(22) Filed: Jan. 11, 2022

(65) Prior Publication Data

US 2023/0222702 A1 Jul. 13, 2023

(51) Int. Cl.
G06T 11/00 (2006.01)
H04L 43/0894 (2022.01)

(52) U.S. Cl.
CPC .......... *G06T 11/00* (2013.01); *H04L 43/0894* (2013.01)

(58) Field of Classification Search
CPC .............................. G06T 11/00; H04L 43/0894
See application file for complete search history.

(56) References Cited

U.S. PATENT DOCUMENTS

| | | | | |
|---|---|---|---|---|
| 6,415,219 | B1 * | 7/2002 | Degodyuk | G08G 1/20 701/411 |
| 8,706,388 | B2 * | 4/2014 | Pschierer | G08G 5/065 340/972 |
| 9,774,992 | B2 | 9/2017 | Wilbur | |
| 10,234,303 | B1 * | 3/2019 | Chandrashekarappa | G08G 5/065 |
| 11,057,736 | B2 * | 7/2021 | Rahman | H04B 17/382 |
| 11,393,348 | B1 * | 7/2022 | Chartier | G08G 5/0008 |
| 11,591,915 | B2 * | 2/2023 | Behlman | F01D 5/186 |
| 2002/0155816 | A1 * | 10/2002 | Fodor | H04W 24/00 455/67.11 |
| 2008/0102809 | A1 | 5/2008 | Beyer | |
| 2012/0135748 | A1 | 5/2012 | Lee et al. | |
| 2014/0335795 | A1 | 11/2014 | Wilbur | |

(Continued)

FOREIGN PATENT DOCUMENTS

JP 2009232197 A 10/2009

OTHER PUBLICATIONS

European Search Report dated Jul. 7, 2023.

*Primary Examiner* — Yu Chen
(74) *Attorney, Agent, or Firm* — CANTOR COLBURN LLP

(57) ABSTRACT

A system includes a memory system configured to store a plurality of instructions to provide aircraft communication visualization and a processing system. The processing system configured to execute the instructions to result in retrieving a plurality of status data associated with aircraft communication at a target location from a database, determining a plurality of geographic location information for a plurality of aircraft parking locations at the target location, accessing a plurality of imagery data associated with a view at the target location, and generating an aircraft communication visualization map for the target location. The aircraft communication visualization map includes aircraft communication information overlaid upon an image based on the imagery data and the aircraft parking locations at the target location.

18 Claims, 4 Drawing Sheets

(56) References Cited

U.S. PATENT DOCUMENTS

| | | | |
|---|---|---|---|
| 2015/0084793 A1* | 3/2015 | Khatwa | G08G 5/065 |
| | | | 340/969 |
| 2015/0120189 A1 | 4/2015 | Giometti et al. | |
| 2015/0281906 A1 | 10/2015 | Tseng et al. | |
| 2016/0063869 A1* | 3/2016 | Kathirvel | G08G 5/0008 |
| | | | 701/3 |
| 2016/0373306 A1* | 12/2016 | Saha | H04L 41/06 |
| 2017/0262732 A1* | 9/2017 | Deng | G06V 20/58 |
| 2018/0016034 A1* | 1/2018 | Joyson | G06Q 10/06315 |
| 2018/0061243 A1* | 3/2018 | Shloosh | G08G 5/0043 |
| 2018/0082594 A1* | 3/2018 | Håkansson | G08G 5/0013 |
| 2018/0218615 A1* | 8/2018 | Myr | B64F 1/002 |
| 2019/0213894 A1* | 7/2019 | Colligan | G08G 5/0013 |
| 2020/0329340 A1* | 10/2020 | Rahman | H04B 17/382 |
| 2021/0049822 A1* | 2/2021 | Meriaz | G06F 3/0482 |
| 2021/0125511 A1* | 4/2021 | Sinha | G08G 5/065 |
| 2021/0125512 A1* | 4/2021 | Costas | G08G 5/0082 |
| 2021/0262826 A1* | 8/2021 | Nelson | G08G 5/006 |
| 2021/0352432 A1 | 11/2021 | Watson et al. | |
| 2022/0258748 A1* | 8/2022 | Vedantam | G07C 5/008 |

* cited by examiner

AIRCRAFT COMMUNICATION VISUALIZATION

BACKGROUND

The subject matter disclosed herein generally relates to aircraft communication systems and, more particularly, to aircraft communication visualization.

Aircraft flight data generated on-board an aircraft can result in recording many, e.g., thousands, of files associated with operation of the aircraft. If a maintenance event occurs, a larger quantity of data may be generated, and the data may need to be analyzed to determine a potential maintenance action when the aircraft lands. Manual data transfer through physical connections can be slow and time consuming with respect to an aircraft. Aircraft equipped with wireless communication interfaces may be capable of more rapidly transferring data; however, the quality of wireless transmission, such as signal strength and transmission rate, can vary from airport to airport and can further vary based on a physical location at an airport affected by interference from steel structures like buildings and interference from other radio devices. This variability can result in difficulties in predicting how long a wireless data transfer may take depending on the physical location of the aircraft. Delays in data transfer can result in aircraft scheduling impacts, maintenance action delays, and other such issues.

BRIEF DESCRIPTION

According to one embodiment, a system includes a memory system configured to store a plurality of instructions to provide aircraft communication visualization and a processing system. The processing system configured to execute the instructions to result in retrieving a plurality of status data associated with aircraft communication at a target location from a database, determining a plurality of geographic location information for a plurality of aircraft parking locations at the target location, accessing a plurality of imagery data associated with a view at the target location, and generating an aircraft communication visualization map for the target location. The aircraft communication visualization map includes aircraft communication information overlaid upon an image based on the imagery data and the aircraft parking locations at the target location.

In addition to one or more of the features described above or below, or as an alternative, further embodiments may include where the status data includes aircraft information and aircraft communication history of one or more wireless interfaces used to transfer data to/from an aircraft.

In addition to one or more of the features described above or below, or as an alternative, further embodiments may include where the aircraft information includes an identifier of the aircraft and a location of performing a transfer of data to/from the aircraft, and the aircraft communication history includes a signal strength, an amount of data transferred, and a duration of transferring the data to/from the aircraft, In addition to one or more of the features described above or below, or as an alternative, further embodiments may include where the geographic location information includes aircraft grouping data associated with the aircraft parking locations, an airport area, and a full airport level.

In addition to one or more of the features described above or below, or as an alternative, further embodiments may include where the imagery data includes a satellite image providing an overhead view, and the imagery data can include an inset map of an airport at the target location.

In addition to one or more of the features described above or below, or as an alternative, further embodiments may include where the aircraft communication visualization map includes one or more visual indicators associated with an average data transfer rate at the aircraft parking locations.

In addition to one or more of the features described above or below, or as an alternative, further embodiments may include where the processing system is configured to execute the instructions to result in outputting to the aircraft communication visualization map, an average data transfer rate for one or more of: an area of an airport, multiple areas of the airport used by a same airline, and a plurality of airports used by the same airline.

In addition to one or more of the features described above or below, or as an alternative, further embodiments may include where the processing system is configured to execute the instructions to result in outputting to the aircraft communication visualization map, a wireless interface usage distribution for one or more of: an area of an airport, multiple areas of the airport used by a same airline, and a plurality of airports used by the same airline.

In addition to one or more of the features described above or below, or as an alternative, further embodiments may include where the processing system is configured to execute the instructions to result in outputting to the aircraft communication visualization map, an average wireless signal strength for one or more of: an area of an airport, multiple areas of the airport used by a same airline, and a plurality of airports used by the same airline.

In addition to one or more of the features described above or below, or as an alternative, further embodiments may include where the processing system is configured to execute the instructions to result in outputting to the aircraft communication visualization map, an average wireless transfer rate for a plurality of airports used by the same airline.

According to an embodiment, a method includes retrieving a plurality of status data associated with aircraft communication at a target location from a database, determining a plurality of geographic location information for a plurality of aircraft parking locations at the target location, accessing a plurality of imagery data associated with a view at the target location, and generating an aircraft communication visualization map for the target location including aircraft communication information overlaid upon an image based on the imagery data and the aircraft parking locations at the target location.

In addition to one or more of the features described above or below, or as an alternative, further embodiments may include outputting to the aircraft communication visualization map, an average data transfer rate for one or more of: an area of an airport, multiple areas of the airport used by a same airline, and a plurality of airports used by the same airline.

In addition to one or more of the features described above or below, or as an alternative, further embodiments may include outputting to the aircraft communication visualization map, a wireless interface usage distribution for one or more of: an area of an airport, multiple areas of the airport used by a same airline, and a plurality of airports used by the same airline.

In addition to one or more of the features described above or below, or as an alternative, further embodiments may include outputting to the aircraft communication visualization map, an average wireless signal strength for one or more of: an area of an airport, multiple areas of the airport used by a same airline, and a plurality of airports used by the same airline.

In addition to one or more of the features described above or below, or as an alternative, further embodiments may include outputting to the aircraft communication visualization map, an average wireless transfer rate for a plurality of airports used by the same airline.

A technical effect of the apparatus, systems and methods is achieved by performing aircraft communication visualization as described herein.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
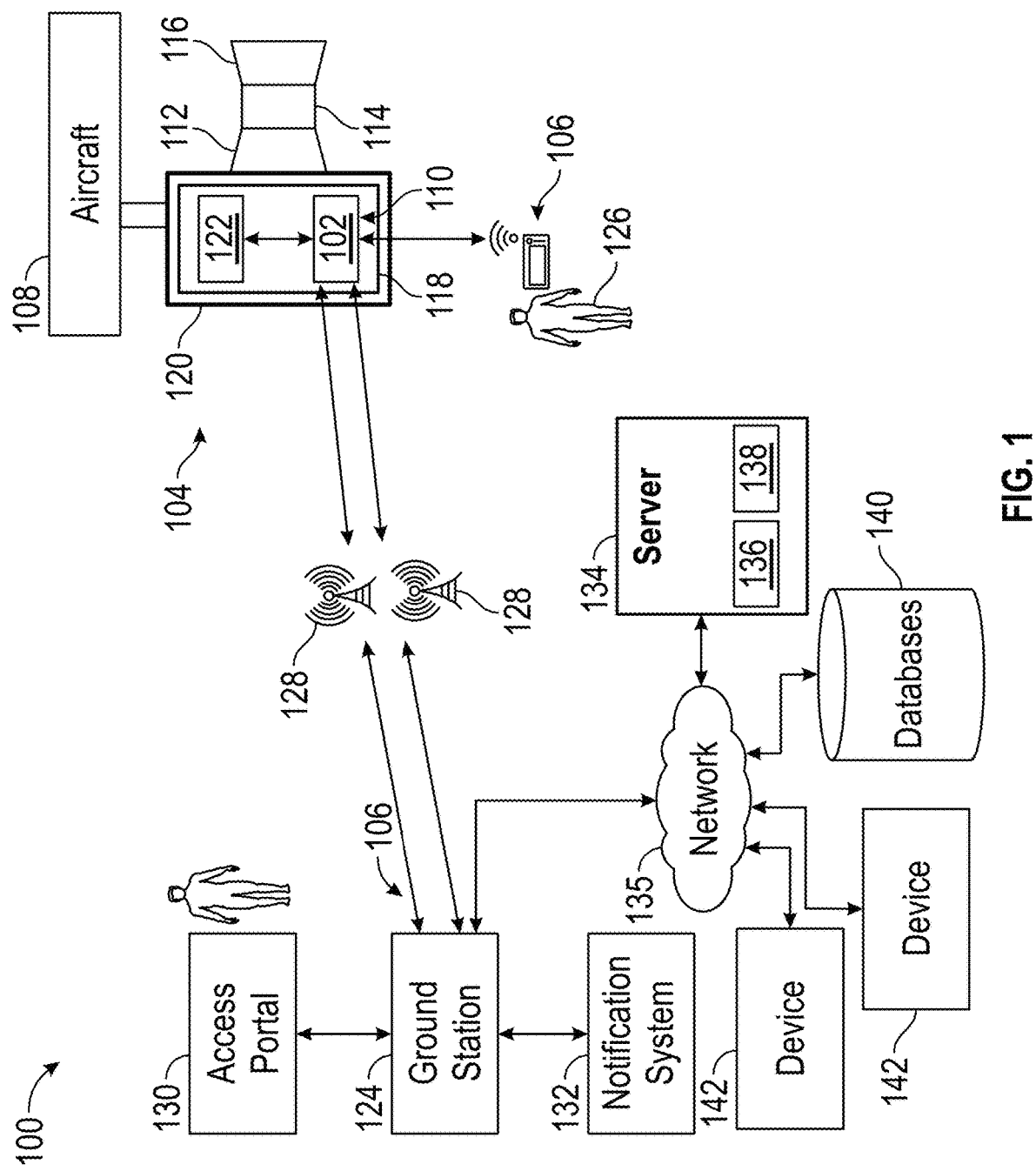
FIG. 1 is a block diagram of a system supporting wireless communication between an aircraft and offboard systems, in accordance with an embodiment of the disclosure.

Referring now to the drawings, FIG. 1 illustrates a system 100 supporting wireless communication between a communication adapter 102 of a gas turbine engine 104 and a plurality of offboard systems 106. The gas turbine engine 104 can be coupled to an aircraft 108, where the aircraft 108 can include multiple instances of the gas turbine engine 104. The gas turbine engine 104 can include a fan section 110, a compressor section 112, a combustor section 114, and a turbine section 116. The fan section 110 drives air along a bypass flow path, while the compressor section 112 drives air along a core flow path for compression and flow into the combustor section 114 then expansion through the turbine section 116. A fan case 118 of the fan section 110 can be covered by a cowling 120 and may provide an installation surface that is cooler than other sections 112-116 of the gas turbine engine 104.

An engine control 122 can be mounted on the fan case 118, or elsewhere, and covered by the cowling 120. The engine control 122 is configured to monitor and control operation of the gas turbine engine 104 in real-time. In order to transfer configuration items, such as programs and data to and from the engine control 122, contemporary systems typically require that the cowling 120 is opened and multiple cables of bundled wires are coupled to the engine control 122. Such a process can ensure deliberate actions are taken in extracting data and performing updates to the engine control 122; however, the process can be slow and require large lengths of customized cables. The communication adapter 102, also referred to as a gas turbine engine communication gateway, can be configured to establish communication with the engine control 122 and wireless communication with one or more offboard systems 106 external to the aircraft 108. Similar to the engine control 122, the communication adapter 102 can be mounted on the fan case 118, or elsewhere, and covered by the cowling 120 of the gas turbine engine 104. Wireless communication can alleviate the need for customized cables or physically opening the cowling 120 to establish communication with the offboard systems 106. Although depicted on the gas turbine engine 104, the communication adapter 102 can be located elsewhere on the aircraft 108 and may be combined with one or more components of the aircraft 108.

The offboard systems 106 can include, for example, a ground station 124, a near-wing maintenance computer 126, an access portal 130, and/or other devices that may establish one-way or two-way wireless communication with the communication adapter 102. For example, a global positioning system (GPS) can provide one-way wireless signaling to the communication adapter 102 to assist in confirming a geographic location of the gas turbine engine 104 and aircraft 108 while the communication adapter 102 is coupled to the gas turbine engine 104. Wireless communication performed by the communication adapter 102 can be through a variety of technologies with different ranges supported. As one example, the communication adapter 102 can support Wi-Fi (e.g., radio wireless local area networking based on IEEE 802.11 or other applicable standards), GPS, cellular networks, satellite communication, and/or other wireless communication technologies known in the art. In embodiments, the communication adapter 102 can support two or more types of wireless communication to provide redundant communication options, such as a cellular communication link and a Wi-Fi communication link. Wireless communication between the communication adapter 102 and the offboard systems 106 can be direct or indirect. For instance, wireless communication between the communication adapter 102 and ground station 124 may pass through one or more network interface components 128, such as a cell tower, a repeater, or a network node, while wireless communication between the communication adapter 102 and the near-wing maintenance computer 126 may be direct wireless communication without any relay components. Further, wireless communication between the communication adapter 102 and ground station 124 may be direct communication without passing through the one or more network interface components 128.

The ground station 124 can enable communication with a variety of support systems, such as an access portal 130 that enables authorized users to access data, initiate tests, configure software, and perform other actions with respect to the engine control 122 or other systems of the aircraft 108, where the communication adapter 102 acts as a secure gateway to limit access and interactions with the engine control 122. As another example, the ground station 124 can communicate with a notification system 132, which may trigger alerts, text messages, e-mails, and the like to authorized recipients regarding operational status of the gas turbine engine 104 and/or other aspects of the aircraft 108 and/or aspects of the communication gateway 102. The near-wing maintenance computer 126 may provide an authorized user with limited authority a capability to query the communication adapter 102 for fault data, test parameters, and other such information. In some embodiments, the near-wing maintenance computer 126 can be authorized with limited authority to make updates to select configuration parameters, software executable or data collection parameters of the communication adapter 102.

In embodiments, the ground station 124 and/or other offboard systems 106 of the system 100 can support communication with a server 134 through a network 135. The server 134 can include a processing system 136 and a memory system 138 configured to store a plurality of computer executable instructions for execution by the processing system 136 and/or data. The executable instructions may be stored or organized in any manner and at any level of abstraction. The processing system 136 can be any type or combination of central processing unit (CPU), including one or more of: a microprocessor, a digital signal processor (DSP), a microcontroller, an application specific integrated circuit (ASIC), a field programmable gate array (FPGA), or the like. Also, in embodiments, the memory system 138 may include volatile memory, such as random access memory (RAM), and non-volatile memory, such as Flash memory, read only memory (ROM), and/or other electronic, optical, magnetic, or any other computer readable medium onto which is stored data and algorithms in a non-transitory form.

The server 134 can also interface with one or more databases 140 and one or more devices 142. The databases 140 can include various data sources that capture data from the communication adapter 102 and/or supplement data to support communication and data analysis. For example, databases 140 may be partitioned by airlines to make fleetwide data available for airline analysis without sharing competitor data. The devices 142 can be any type of processing device capable of communicating through the network 135. For instances, the devices 142 can include personal computers, workstations, tablet computers, mobile phones, wearable computing devices, and the like. The devices 142 may connect at a remote location from the server 134 and the ground station 124. Further, the devices 142 may include an electronic flight bag device that can be used within the aircraft 108. For instance, an electronic flight bag device may be periodically updated with information when a wireless communication channel is available and need not be continuously connected.

Figure 2:
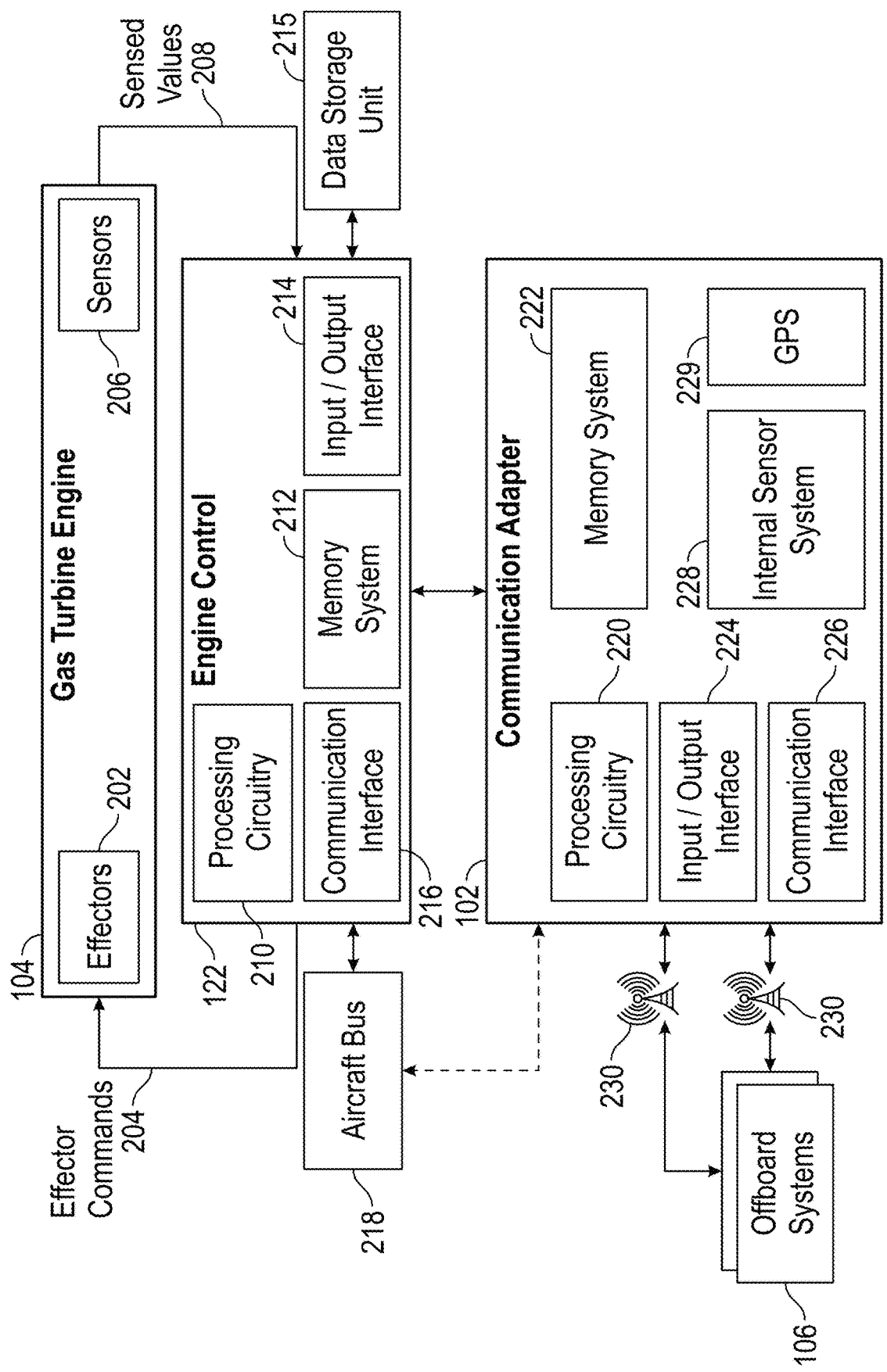
FIG. 2 is a block diagram illustrating further details of the system of FIG. 1, in accordance with an embodiment of the disclosure.

FIG. 2 is a block diagram illustrating further details of the system 100 of FIG. 1, in accordance with an embodiment of the disclosure. The engine control 122 can control effectors 202 of the gas turbine engine 104 by generating one or more effector commands 204. Examples of effectors 202 can include one or more motors, solenoids, valves, relays, pumps, heaters, and/or other such actuation control components. A plurality of sensors 206 can capture state data associated with the gas turbine engine 104 and provide sensed values 208 as feedback to the engine control 122 to enable closed-loop control of the gas turbine engine 104 according to one or more control laws. Examples of the sensors 206 can include one or more temperature sensors, pressure sensors, strain gauges, speed sensors, accelerometers, lube sensors, and the like.

The engine control 122 can be a full authority digital engine control that includes processing circuitry 210 and a memory system 212 configured to store a plurality of configuration items, where at least one of the configuration items includes a sequence of the computer executable instructions for execution by the processing circuitry 210. Other types of configuration items can include but are not limited to data, such as constants, configurable data, and/or fault data. Examples of computer executable instructions can include boot software, operating system software, and/or application software. The executable instructions may be stored or organized in any manner and at any level of abstraction, such as in connection with controlling and/or monitoring operation of the gas turbine engine 104. The processing circuitry 210 can be any type or combination of central processing unit (CPU), including one or more of: a microprocessor, a digital signal processor (DSP), a microcontroller, an application specific integrated circuit (ASIC), a field programmable gate array (FPGA), or the like. Also, in embodiments, the memory system 212 may include volatile memory, such as random access memory (RAM), and non-volatile memory, such as Flash memory, read only memory (ROM), and/or other electronic, optical, magnetic, or any other computer readable medium onto which is stored data and algorithms in a non-transitory form.

In some embodiments, a data storage unit 215 may interface with the engine control 122. The data storage unit 215 can include various types of fault records, configuration data, and/or other information specific to a current configuration of the system 100. The data storage unit 215 can appear to the engine control 122 as a portion of addresses as an extension of the memory system 212 and may be in close physical proximity to the engine control 122 (e.g., physically coupled together).

The engine control 122 can also include one or more of an input/output interface 214, a communication interface 216, and/or other elements. The input/output interface 214 can include support circuitry for interfacing with the effectors 202 and sensors 206, such as filters, amplifiers, digital-to-analog converters, analog-to-digital converters, and other such circuits to support digital and/or analog interfaces. Further, the input/output interface 214 can receive or output signals to/from other sources. The communication interface 216 can be communicatively coupled to the communication adapter 102. The communication interface 216 may also communicate with an aircraft bus 218 of the aircraft 108 of FIG. 1. The aircraft bus 218 may provide aircraft-level parameters and commands that are used by the engine control 122 to control the gas turbine engine 104 in real-time.

Similar to the engine control 122, the communication adapter 102 can include processing circuitry 220, a memory system 222, an input/output interface 224, and a communication interface 226. The processing circuitry 220 can be any type or combination of central processing unit (CPU), including one or more of: a microprocessor, a digital signal processor (DSP), a microcontroller, an application specific integrated circuit (ASIC), a field programmable gate array (FPGA), or the like. Also, in embodiments, the memory system 222 may include volatile memory, such as random access memory (RAM), and non-volatile memory, such as Flash memory, read only memory (ROM), hard disk drive, and/or other electronic, optical, magnetic, or any other computer readable medium onto which is stored data and algorithms in a non-transitory form. The memory system 222 can be selectively encrypted or otherwise secured to limit unauthorized read and write operations. The communication adapter 102 can also include an internal sensor system 228. The internal sensor system 228 can include, for example, one or more accelerometers, gyroscopes, barometers, a magnetometer (e.g., a compass), and other such sensors. Further, the communication adapter 102 can include other devices, such as a GPS receiver 229. The input/output interface 224 can process data collected from the internal sensors 228 and condition the data in a format usable by the processing circuitry 220. The communication interface 226 can interface with one or more antennas 230, which may be integrated with the communication adapter 102 or located remotely from the communication adapter 102, e.g., a shark-fin antenna mounted under or on the cowling 120 of FIG. 1. Although depicted separately in FIGS. 1 and 2, in some embodiments the engine control 122 and communication adapter 102 can be combined, for instance, where the communication adapter 102 is a module or processing core within the engine control 122.

The communication adapter 102 can act as a secure communication gateway with respect to the offboard systems 106. For example, the offboard systems 106 can request to download files or other configuration items from the memory system 212 of the engine control 122 through the communication adapter 102. The communication interface 216 of the engine control 122 can interface to the communication interface 226 of the communication adapter 102 through a wired, optical, or magnetic coupling. The communication interface 226 can communicate wirelessly through one or more antennas 230 to the offboard systems 106. The communication interface 226 may also have access to receive data directly from the aircraft bus 218 in some embodiments. In alternate embodiments, the communication adapter 102 can send a request to the engine control 122 to provide aircraft parameters received via the aircraft bus 218 and/or engine parameters computed by the engine control 122.

The communication adapter 102 can manage credentials and user authentication to limit access of the memory system 212 of the engine control 122. User authentication can be defined for particular users or classes of users, such as equipment-owner users, maintenance technicians, engineering users, and the like. For example, a maintenance technician may have authority to adjust trimmable constants or reprogram certain regions of the memory system 212. An engineering user may have authority to reprogram an operating system, boot program code, or application software in the memory system 212, in addition to having permissions of the maintenance technician and the equipment-owner user. If user authentication fails, for instance, by user credentials not being recognized with respect to user authentication data, then the communication adapter 102 can block access of the offboard systems 106 from reading from or writing to the memory system 212.

The aircraft 108 of FIG. 1 can have multiple communication adapters 102 (e.g., one per engine, one on aircraft). In some embodiments, each of the communication adapters 102 can establish a wireless link with the offboard systems 106. Depending on the bandwidth and availability of multiple communication paths, the communication adapters 102 of the same aircraft 108 can establish wireless links with the offboard systems 106 as parallel communication paths to reduce a total transfer time to transfer data to/from the aircraft 108. Where communication quality is lower, the communication adapters 102 of the aircraft 108 can be sequenced in a series of communications. Where one of the communication adapters 102 is able to establish a higher quality wireless connection (e.g., a higher transmission rate), such a communication adapter 102 can act as a communication hub for other communication adapters 102 of the aircraft 108. For example, if one of the communication adapters 102 has a radio fault, data scheduled to be transferred by the faulty communication adapter 102 can be transferred (e.g., through an engine bus or the aircraft bus 218) to a non-faulty communication adapter 102 for wireless transfer with the offboard systems 106.

Figure 3:
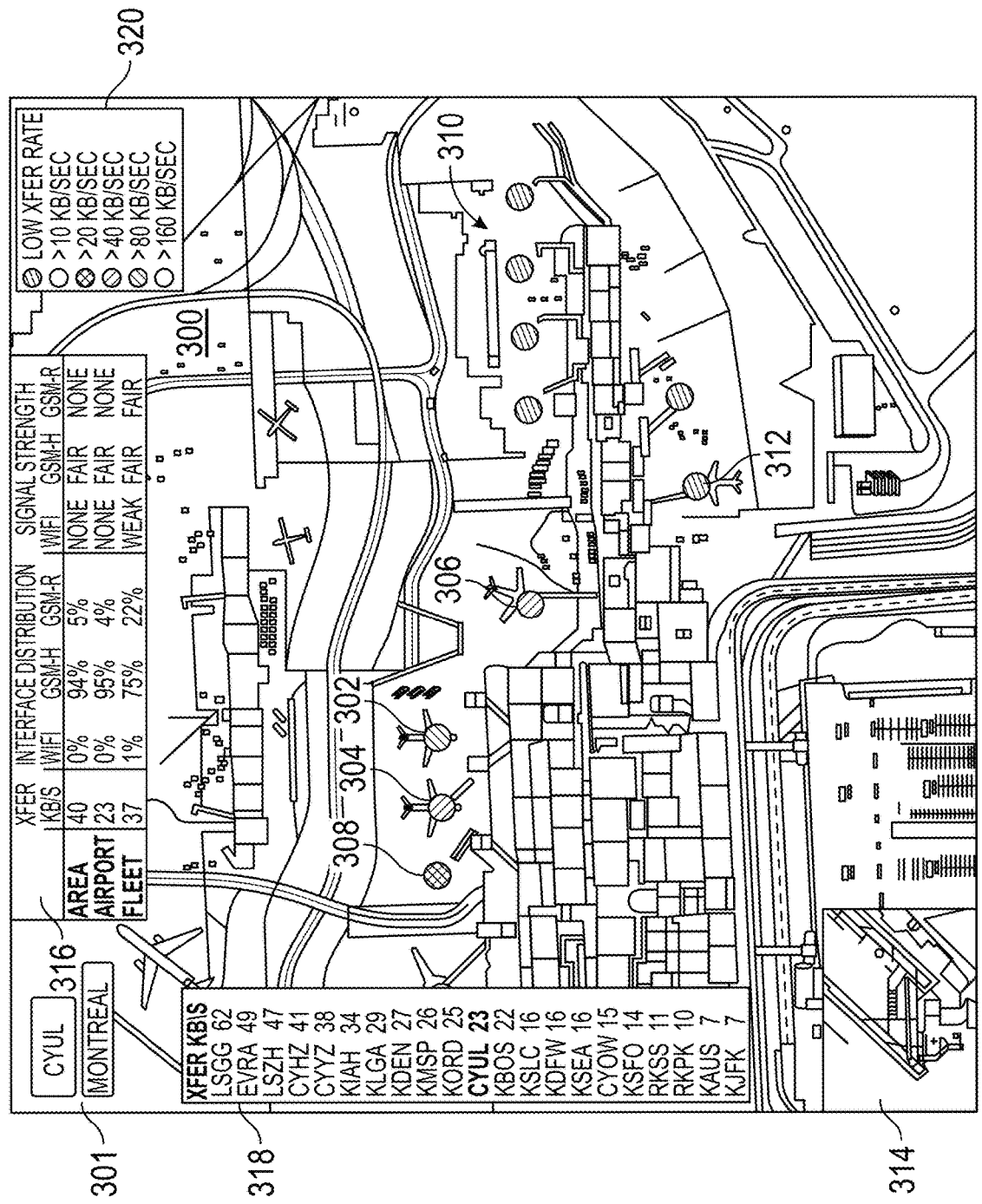
FIG. 3 is an example of an aircraft communication visualization map, in accordance with an embodiment of the disclosure.

FIG. 3 is an example of an aircraft communication visualization map 300, in accordance with an embodiment of the disclosure. The aircraft communication visualization map 300 can be generated by the server 134 of FIG. 1 for display on one or more of the devices 142 of FIG. 1. For instance, when airline support personnel or a flight crew of the aircraft 108 of FIG. 1 determine that a wireless transfer of data should occur for the aircraft 108 at a particular airport, an application or web page on one of the devices 142 can display the aircraft communication visualization map 300 as generated by the server 134. The aircraft communication visualization map 300 can be customized to view data specific to an airline fleet at airports where the airline operates. The server 134 can gather data from multiple data sources which collect wireless communication metrics from previous wireless transfers from aircraft 108 at various locations at each airport. The results can be visually depicted on the aircraft communication visualization map 300 to assist in determining where and when to transfer data stored on the aircraft 108. The aircraft communication visualization map 300 can also assist in predicting how long a data transfer may typically take, where the data transfer location is known. The aircraft communication visualization map 300 may also be used to trigger other actions. For example, aircraft parking location 302 may have twice the data transfer rate as aircraft parking locations 304 and 306, and aircraft parking location 302 may have four times the data transfer rate as aircraft parking location 308. Therefore, an operator of aircraft 108 scheduled to be parked at aircraft parking location 308 may prefer to delay transferring of data until located at a higher transfer rate location or departure scheduling may need to be adjusted to provide adequate time for the data transfer. There may be airport areas, such as airport area 310, where data transfer rates are very low or wireless communication is not possible with the ground station 124 of FIG. 1. When the aircraft 108 is at aircraft parking location 312 in the airport area 310, it may trigger a notification for a maintenance crew to bring a near-wing maintenance computer 126 to the aircraft 108 for data transfer, and the near-wing maintenance computer 126 can be physically moved to a location where the data can be accessed, e.g., closer to one or more network interface components 128.

As depicted in the example of FIG. 3, the aircraft communication visualization map 300 can use a view at a target location, such as a satellite image, schematic, or other line drawing, to visualize and airport area where an airline has gates or other such facilities. The view can be an overhead view or a perspective view from one or more viewing angles in two or three dimensions. The aircraft communication visualization map 300 can also include inset map 314 of an airport at the target location. For instance, the inset map 314 can provide a wider perspective view at a reduced scale, while a primary view of the aircraft communication visualization map 300 may be focused on a group aircraft parking locations in an airport area. The inset map 314 can be a line drawing, while other features can be depicted with a different perspective, such as a camera-based image or model. The inset map 314 can also include data transfer and/or connection strength information summarized in shapes, colors, and/or patterns for an airline.

Various types of icons and overlays can be available for display on the aircraft communication visualization map 300. For example, the aircraft communication visualization map 300 can display an airport identifier 301, such as an airport code and/or location. The aircraft communication visualization map 300 may also display summary information, such as a wireless interface usage distribution 316. The wireless interface usage distribution 316 can include data transfer rates (e.g., kilobytes per second), interface types used (e.g., percentage use of WiFi, mobile/cell home, and/or mobile/cell roaming connections), and signal strength for each type of interface. The wireless interface usage distribution 316 can include data for an area of an airport (e.g., one or more gates/parking locations), multiple areas of the airport used by a same airline (e.g., all locations used by the airline at the same airport), and a plurality of airports used by the same airline (e.g., fleet data). The signal strength displayed with the wireless interface usage distribution 316 can include an average wireless signal strength for one or more of: an area of an airport, multiple areas of the airport used by a same airline, and a plurality of airports used by the same airline. The aircraft communication visualization map 300 may also display an average data transfer rate 318 for the airport as compared to other airports. Further, the average data transfer rate 318 may be selectable to display one or more of data transfer rates for: an area of an airport, multiple areas of the airport used by a same airline, and a plurality of airports used by the same airline.

The aircraft communication visualization map 300 may also display a key 320 to assist in interpreting various icons and colors displayed on the aircraft communication visualization map 300. For example, the key 320 may indicate how various shapes, colors, and/or patterns map to data transfer rate, signal strength and/or communication method, such as WiFi or cellular. In the example of FIG. 3, all of the data transfer rate variations appear as colored/shaded circles; however, it will be understood that other shapes and/or shape variations can be used. For example, signal strength can be depicted using triangles, squares, or other such shapes. Further, hovering a pointer, tapping, or otherwise selecting a location on the aircraft communication visualization map 300 may provide additional information, such as a summary of past data transfers at the location. The underlying data used to create the aircraft communication visualization map 300 can be periodically refreshed (e.g., hourly or daily) to reflect recent conditions. Further, underlying data can be updated as wireless transfers are performed.

Figure 4:
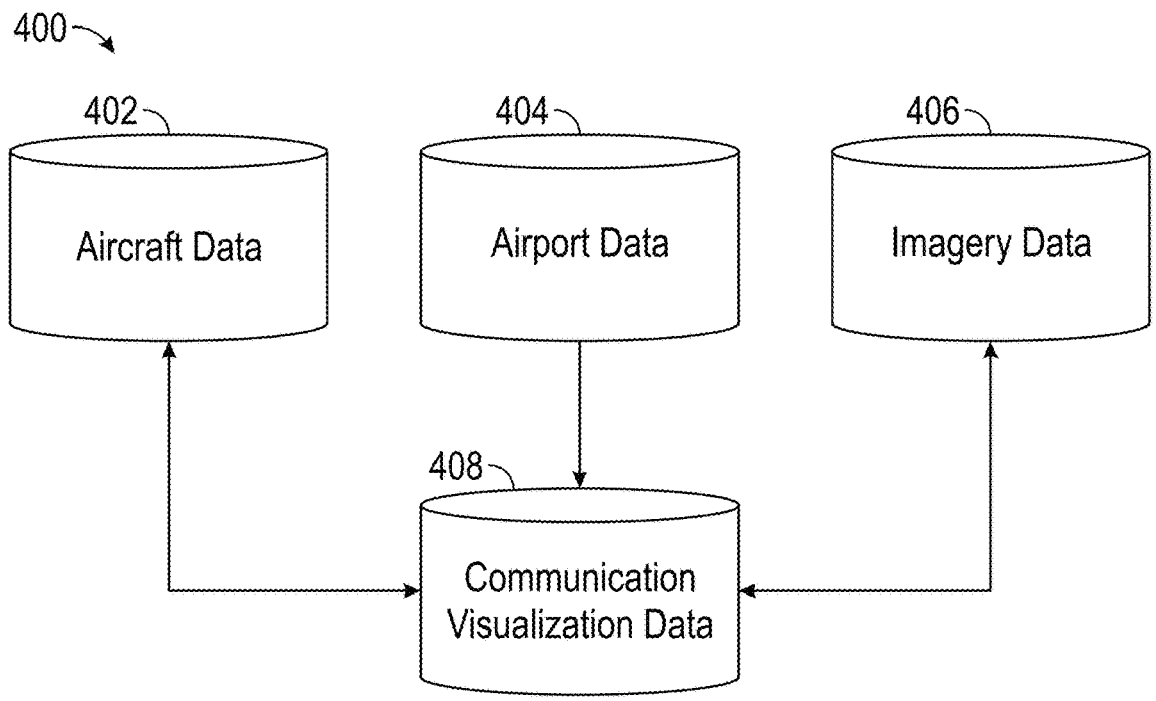
FIG. 4 is a block diagram of a data flow, in accordance with an embodiment of the disclosure.

FIG. 4 is a block diagram of a data flow 400, in accordance with an embodiment of the disclosure. The data flow 400 is an example of data sources that may be accessed to generate the aircraft communication visualization map 300 of FIG. 3. For instance, aircraft data 402, airport data 404, and imagery data 406 can be accessed to populate communication visualization data 408 for use by the server 134 of FIG. 1 in generating and/or updating the aircraft communication visualization map 300. The aircraft data 402, airport data 404, and imagery data 406 are examples of the databases 140 of FIG. 1. The aircraft data 402 can be collected through interactions with the ground station 124 of FIG. 1. The airport data 404 and imagery data 406 may be available through secure connections via the network 135 of FIG. 1. There may be multiple instances of the aircraft data 402 to keep airline data isolated between different airlines, while the airport data 404 and imagery data 406 may be shared by multiple airlines.

Figure 5:
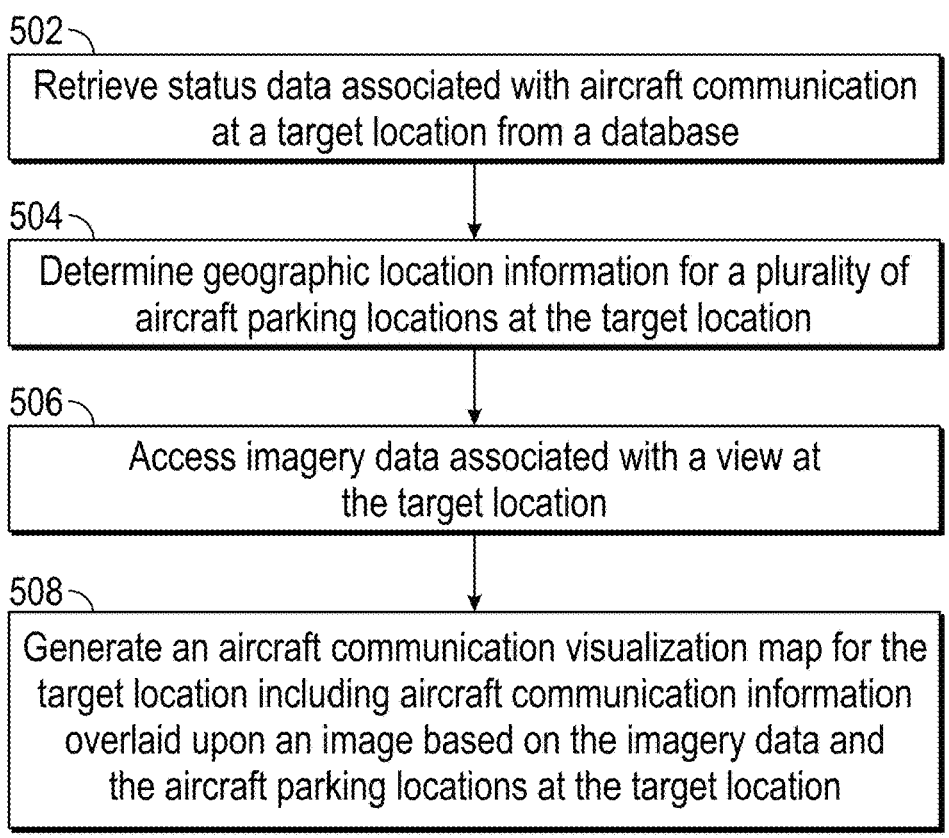
FIG. 5 is a flow chart illustrating a method, in accordance with an embodiment of the disclosure.

Referring now to FIG. 5 with continued reference to FIGS. 1-4, FIG. 5 is a flow chart illustrating a method 500 for aircraft communication visualization in accordance with an embodiment. The method 500 may be performed, for example, using the communication adapter 102 in conjunction with the engine control 122 of FIG. 1 and at least one of the offboard systems 106 of FIG. 1.

At block 502, the processing system 136 can retrieve a plurality of status data associated with aircraft communication at a target location from a database. The database can be one or more databases 140 to extract aircraft data 402. The target location can be an airport. The status data can include aircraft information and aircraft communication history of one or more wireless interfaces used to transfer data from an aircraft 108. The aircraft information can include an identifier (e.g., aircraft registration number, aircraft serial number) of the aircraft 108 and a location of performing a transfer of data to/from the aircraft, such as GPS coordinates. The aircraft communication history can include a signal strength, an amount of data transferred, and a duration of transferring the data to/from the aircraft 108. The signal strength can include multiple communication types, such as a cellular signal strength and/or a Wi-Fi signal strength.

At block 504, the processing system 136 can determine a plurality of geographic location information for a plurality of aircraft parking locations at the target location. The geographic location information can include aircraft grouping data associated with the aircraft parking locations, an airport area, and a full airport level. For instance, when determining values for an airport, a time history of multiple aircraft data transfers at multiple aircraft parking locations can be analyzed to determine averages with respect to an airline. An aircraft parking location can be grouped within about 15 meters, for example, while an airport area can be grouped at about 400 meters, and an airport can be grouped at about 5,000 meters. Other grouping sizes and distributions can be implemented. Airport information can be retrieved, for instance, from airport data 404.

At block 506, the processing system 136 can access imagery data 406 associated with a view at the target location. The imagery data 406 can include a satellite image and an inset map 314 of an airport at the target location. Alternatively, a schematic or other type of line drawings can be used to generate an image of the airport or an area of the airport.

At block 508, the processing system 136 can generate an aircraft communication visualization map 300 for the target location including aircraft communication information overlaid upon an image based on the imagery data 406 and the aircraft parking locations at the target location. The aircraft communication visualization map 300 can include one or more visual indicators associated with an average data transfer rate at the aircraft parking locations. Generation of the aircraft communication visualization map 300 can include filtering non-airport locations and infrequently used airport areas. The airport data 404 can be used to create bounding boxes associated with the images from the imagery data 406 and correlate coordinates between images and location data from the aircraft data 402 and airport data 404.

In some embodiments, the processing system 136 can output to the aircraft communication visualization map 300, an average data transfer rate for one or more of: an area of an airport, multiple areas of the airport used by a same airline, and a plurality of airports used by the same airline. In some embodiments, the processing system 136 can output to the aircraft communication visualization map 300, a wireless interface usage distribution for one or more of: an area of an airport, multiple areas of the airport used by a same airline, and a plurality of airports used by the same airline. In some embodiments, the processing system 136 can output to the aircraft communication visualization map 300, an average wireless signal strength for one or more of: an area of an airport, multiple areas of the airport used by a same airline, and a plurality of airports used by the same airline. In some embodiments, the processing system 136 can output to the aircraft communication visualization map 300, an average wireless transfer rate for a plurality of airports used by the same airline. Other types of outputs can be overlaid on the aircraft communication visualization map 300.

While the above description has described the flow process of FIG. 5 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system comprising:
    a memory system configured to store a plurality of instructions to provide aircraft communication visualization; and
    a processing system configured to execute the instructions to result in:
        retrieving a plurality of status data associated with aircraft communication at a target location from a database, wherein the status data comprises aircraft information and aircraft communication history of one or more wireless interfaces used to transfer data to/from an aircraft;
        determining a plurality of geographic location information for a plurality of aircraft parking locations at the target location;
        accessing a plurality of imagery data associated with a view at the target location;
        generating an aircraft communication visualization map for the target location comprising aircraft communication information overlaid upon an image based on the imagery data, wherein one or more visual indicators of the aircraft communication information are overlaid upon two or more of the aircraft parking locations at the target location, wherein the aircraft communication visualization map comprises a primary view including an overhead view at the target location with the one or more visual indicators and an inset map of an airport at the target location, the inset map having a wider perspective view at a reduced scale relative to the primary view, and the inset map depicting an expanded area extending beyond the primary view; and
        predicting a data transfer duration at one or more data transfer locations corresponding to the one or more visual indicators based on the status data.

2. The system of claim 1, wherein the aircraft information comprises an identifier of the aircraft and a location of performing a transfer of data to/from the aircraft, and the aircraft communication history comprises a signal strength, an amount of data transferred, and a duration of transferring the data to/from the aircraft.

3. The system of claim 1, wherein the geographic location information comprises aircraft grouping data associated with the aircraft parking locations, an airport area, and a full airport level.

4. The system of claim 1, wherein the imagery data comprises a satellite image providing the overhead view, and the inset map comprises one or more additional visual indicators of the aircraft communication information for an airline in the expanded area.

5. The system of claim 1, wherein the one or more visual indicators are associated with an average data transfer rate at the two or more of the aircraft parking locations.

6. The system of claim 1, wherein the processing system is configured to execute the instructions to result in:
    outputting to the aircraft communication visualization map, an average data transfer rate for one or more of: an area of the airport, multiple areas of the airport used by a same airline, and a plurality of airports used by the same airline.

7. The system of claim 1, wherein the processing system is configured to execute the instructions to result in:
    outputting to the aircraft communication visualization map, a wireless interface usage distribution for one or more of: an area of the airport, multiple areas of the airport used by a same airline, and a plurality of airports used by the same airline.

8. The system of claim 1, wherein the processing system is configured to execute the instructions to result in:
    outputting to the aircraft communication visualization map, an average wireless signal strength for one or more of: an area of the airport, multiple areas of the airport used by a same airline, and a plurality of airports used by the same airline.

9. The system of claim 1, wherein the processing system is configured to execute the instructions to result in:
    outputting to the aircraft communication visualization map, an average wireless transfer rate for a plurality of airports used by the same airline.

10. A method comprising:
    retrieving a plurality of status data associated with aircraft communication at a target location from a database, wherein the status data comprises aircraft information and aircraft communication history of one or more wireless interfaces used to transfer data to/from an aircraft;
    determining a plurality of geographic location information for a plurality of aircraft parking locations at the target location;
    accessing a plurality of imagery data associated with a view at the target location;
    generating an aircraft communication visualization map for the target location comprising aircraft communication information overlaid upon an image based on the imagery data, wherein one or more visual indicators of the aircraft communication information are overlaid upon two or more of the aircraft parking locations at the target location, wherein the aircraft communication visualization map comprises a primary view including an overhead view at the target location with the one or more visual indicators and an inset map of an airport at the target location, the inset map having a wider perspective view at a reduced scale relative to the primary view, and the inset map depicting an expanded area extending beyond the primary view; and predicting a data transfer duration at one or more data transfer locations corresponding to the one or more visual indicators based on the status data.

11. The method of claim 10, wherein the aircraft information comprises an identifier of the aircraft and a location of performing a transfer of data to/from the aircraft, and the aircraft communication history comprises a signal strength, an amount of data transferred, and a duration of transferring the data to/from the aircraft.

12. The method of claim 10, wherein the geographic location information comprises aircraft grouping data associated with the aircraft parking locations, an airport area, and a full airport level.

13. The method of claim 10, wherein the imagery data comprises a satellite image providing the overhead view, and the inset map comprises one or more additional visual indicators of the aircraft communication information for an airline in the expanded area.

14. The method of claim 10, wherein the one or more visual indicators are associated with an average data transfer rate at the two or more of the aircraft parking locations.

15. The method of claim 10, further comprising:
outputting to the aircraft communication visualization map, an average data transfer rate for one or more of: an area of the airport, multiple areas of the airport used by a same airline, and a plurality of airports used by the same airline.

16. The method of claim 10, further comprising:
outputting to the aircraft communication visualization map, a wireless interface usage distribution for one or more of: an area of the airport, multiple areas of the airport used by a same airline, and a plurality of airports used by the same airline.

17. The method of claim 10, further comprising:
outputting to the aircraft communication visualization map, an average wireless signal strength for one or more of: an area of the airport, multiple areas of the airport used by a same airline, and a plurality of airports used by the same airline.

18. The method of claim 10, further comprising:
outputting to the aircraft communication visualization map, an average wireless transfer rate for a plurality of airports used by the same airline.

* * * * *